United States Patent
Scarfe

(10) Patent No.: US 12,214,953 B2
(45) Date of Patent: *Feb. 4, 2025

(54) INSULATING LINER

(71) Applicant: BIOCHILL PTY LIMITED, Gladesville (AU)

(72) Inventor: Bernadette Scarfe, Gladesville (AU)

(73) Assignee: BIOCHILL PTY LIMITED, Gladesville (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/639,833

(22) Filed: Apr. 18, 2024

(65) Prior Publication Data
US 2024/0262601 A1  Aug. 8, 2024

Related U.S. Application Data

(63) Continuation of application No. 18/393,035, filed on Dec. 21, 2023, which is a continuation of application No. PCT/AU2023/050545, filed on Jun. 19, 2023.

(30) Foreign Application Priority Data

Nov. 14, 2022 (AU) .................. 2022903415

(51) Int. Cl.
B65D 81/38  (2006.01)
B32B 3/26  (2006.01)
(Continued)

(52) U.S. Cl.
CPC .......... *B65D 81/3823* (2013.01); *B32B 3/266* (2013.01); *B32B 29/005* (2013.01);
(Continued)

(58) Field of Classification Search
CPC .......... B65D 81/3823; B65D 25/04; B65D 81/3897; B32B 3/266; B32B 29/005;
(Continued)

(56) References Cited

U.S. PATENT DOCUMENTS

2007/0186580 A1* 8/2007 Kaplan ............... A23L 3/36
62/530
2015/0064377 A1 3/2015 Van Berlo et al.
(Continued)

FOREIGN PATENT DOCUMENTS

CN 106945348 A 7/2017
CN 110228262 B 5/2021
(Continued)

OTHER PUBLICATIONS

International Application No. PCT/AU2023/050545, International Search Report and Written Opinion mailed on Aug. 17, 2023, 10 pages.

*Primary Examiner* — Shawn M Braden
(74) *Attorney, Agent, or Firm* — Kilpatrick Townsend & Stockton LLP

(57) ABSTRACT

Thermal storage containers for storing or transporting thermally sensitive materials are provided. The containers make use of a thermally insulating liner composed of one or more perforated corrugated cardboard layers sealed within a sealing film. The thermally insulating liners possess excellent thermal insulation properties and may be fully recyclable.

30 Claims, 5 Drawing Sheets

"E" flute
 1.1-2 mm

"B" flute
 2.5-3 mm

"C" flute
 3.5-4 mm

"B/C" flute
 2.5-3 mm
3.5-4 mm

(51) Int. Cl.
*B32B 29/00* (2006.01)
*B32B 29/08* (2006.01)
*B65D 25/04* (2006.01)

(52) U.S. Cl.
CPC .............. *B32B 29/08* (2013.01); *B65D 25/04* (2013.01); *B65D 81/3897* (2013.01); *B32B 2250/26* (2013.01); *B32B 2307/304* (2013.01); *B32B 2307/718* (2013.01); *B32B 2307/7246* (2013.01); *B32B 2307/7265* (2013.01); *B32B 2307/7376* (2023.05); *B32B 2439/62* (2013.01); *B32B 2553/00* (2013.01)

(58) Field of Classification Search
CPC ................ B32B 29/08; B32B 2250/26; B32B 2307/304; B32B 2307/718; B32B 2307/7246; B32B 2307/7265; B32B 2307/7376; B32B 2439/62; B32B 2553/00; B32B 2255/26; B32B 15/12
See application file for complete search history.

(56) References Cited

U.S. PATENT DOCUMENTS

| | | |
|---|---|---|
| 2019/0100369 A1 | 4/2019 | Hoffman et al. |
| 2021/0139200 A1 | 5/2021 | O'Hara et al. |
| 2023/0415449 A1* | 12/2023 | Tattam .................... B32B 3/266 |
| 2024/0158154 A1* | 5/2024 | Scarfe ................ B65D 81/3823 |
| 2024/0166422 A1* | 5/2024 | Lantz ................. B65D 81/3825 |

FOREIGN PATENT DOCUMENTS

| | | |
|---|---|---|
| WO | 2011/111735 A1 | 10/2010 |
| WO | 2022/100888 A1 | 5/2022 |

\* cited by examiner a)

b)

INSULATING LINER

CROSS-REFERENCE TO RELATED APPLICATIONS

The present application is a continuation of U.S. patent application Ser. No. 18/393,035 filed Dec. 21, 2023, which is a continuation of PCT/AU2023/050545, filed Jun. 19, 2023, which claims priority to AU 2022903415, filed Nov. 14, 2022, each of which is hereby incorporated by reference in its entirety.

FIELD OF THE DISCLOSURE

Thermal storage containers for storing or transporting thermally sensitive materials are provided. The containers make use of a thermally insulating liner composed of one or more perforated corrugated cardboard layers sealed within a sealing film.

BACKGROUND OF THE DISCLOSURE

A cold chain product is any product that is temperature sensitive. Examples of cold chain products include pharmaceuticals, vaccines, biologics, laboratory samples, diagnostic materials, chemicals, food, and beverages. These temperature-sensitive products rely on cold chain management for product efficacy, product safety, and adherence to regulatory requirements. Cold chain products may spoil, become unsafe, and even dangerous to public health if the correct temperature and environment is not maintained throughout the cold supply chain.

These requirements have led to the development of cold chain product packaging solutions in which the cold chain product is stored and transported within an insulated container along with refrigerant. Insulation typically comprises expanded polystyrene (EPS) panels or "popcorn".

However, EPS is not environmentally sustainable. It is not readily biodegradable, and once expanded it is difficult to re-mould and the majority ends up in landfill, which is problematic due to its disproportionate size.

Alternatives to EPS have gained increasing attention but it is challenging to meet both the excellent insulation properties of EPS and its low cost. For example corrugated cardboard has been used to form containers for transporting goods. However corrugated cardboard is rigid and lacks the flexibility desirable in many applications.

International patent application publication no. WO 2010/111735 describes a material comprising a flat paper layer and a corrugated paper layer bonded to one face of the flat paper layer wherein the corrugated paper layer comprises indentations formed across an opposite face of the corrugated layer. The material is proposed to be used as insulation, however the publication contains no information regarding thermal performance.

In view of the foregoing there is a need to provide alternative solutions for thermal insulation which may be applied in cold chain packaging.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In one aspect the present disclosure provides a thermally insulating liner comprising one or more layers of perforated corrugated cardboard stacked to form an insulating pad and an outer sealing film covering the insulating pad.

In embodiments, the one or more layers of perforated corrugated cardboard are derived from one or more of single or multiple fluted corrugated cardboard.

In embodiments, the one or more layers of perforated corrugated cardboard are derived from one or more of single fluted, double fluted, and triple fluted corrugated cardboard.

In embodiments, the perforated corrugated cardboard is produced on a commercial cardboard perforating machine.

In embodiments, a layer of the perforated corrugated cardboard is more compressible in a direction perpendicular to a major surface of the perforated corrugated cardboard compared to a layer of non-perforated corrugated cardboard from which the perforated corrugated cardboard is derived.

In embodiments, a layer of perforated corrugated cardboard has an areal weight from about 100 $g/m^2$ to about 300 $g/m^2$.

In embodiments, a layer of perforated corrugated cardboard has a thickness from about 0.5 mm to about 10 mm.

In embodiments, the insulating pad has a thickness from about 10 mm to about 150 mm.

In embodiments, the insulating pad has a thickness from about 10 mm to about 70 mm.

In embodiments, the insulating pad comprises at least two layers of perforated corrugated cardboard.

In embodiments, the insulating pad comprises at least two layers of perforated corrugated cardboard which are derived from different corrugated cardboard flute designs, or at least three layers which are derived from different corrugated cardboard flute designs In embodiments, a layer of perforated corrugated cardboard comprises slits which penetrate the major outside surfaces of the layer. In embodiments, the slits are in the form of a seamless repeating pattern.

In embodiments, a layer of perforated corrugated cardboard comprises regions across the major outside surfaces of the layer which are raised and lowered relative to each other.

In embodiments, a layer of perforated corrugated cardboard has a web like structure.

In embodiments, the insulating pad is compressible in a direction perpendicular to a major surface of the insulating pad.

In embodiments, the insulating pad is more compressible in a direction perpendicular to a major surface of the insulating pad compared to an insulating pad comprising non-perforated corrugated cardboard.

In embodiments, adjacent layers of perforated corrugated cardboard interlock with one another.

In embodiments, the thickness of the insulating pad is at least 10% less than the thickness of an equivalent insulating pad constructed from non-perforated corrugated cardboard, or at least 20% less, or at least 30% less, or at least 40% less, or at least 50% less.

In embodiments, the thickness of the insulating pad comprising one or more layers of perforated corrugated cardboard is significantly less than the thickness of a pad comprising the same layer(s) absent perforation, that is, layer(s) of corrugated cardboard. This is advantageous and unexpected. Perforation also allows layers to interlock together thus reducing the overall thickness of the insulating pad which is desirable as it reduces the overall volume of the insulating pad and thus the volume of a container within which the insulating liner is utilised. Surprisingly, despite the reduction in insulating pad thickness, thermal effectiveness is excellent. This in part because of the low density of the perforated corrugated cardboard and the presence of passages where air is trapped in defined spaces between the layers of perforated corrugated cardboard.

Additionally, transportation of liners is more efficient due to this reduction of liner volume.

In embodiments, the thickness of the insulating pad may be at least 50% less than the thickness of an equivalent insulating pad constructed from non-perforated corrugated cardboard.

In embodiments, the perforated corrugated cardboard layers have pockets of air located between the layers. This results in improved thermal insulation.

Perforated corrugated cardboard is also flexible which is advantageous in terms of producing an insulating liner that conforms to the internal shape of a container within which it may be placed.

Perforated corrugated cardboard also has cushioning properties which is advantageous in relation to shock absorption and support of a thermally sensitive article.

In embodiments, the outer sealing film comprises a moisture proof or water proof sealing film.

In embodiments, the outer sealing film comprises an acrylic polymer or copolymer.

In embodiments, the outer sealing film comprises a styrene acrylic copolymer.

In embodiments, the outer sealing film comprises heat sealable paper. The heat sealable paper may be coated on one or both sides with a water-based coating.

The water-based coating may be recyclable. The water-based coating may maintain the pulpability of the insulating liner.

In embodiments, the outer sealing film comprises polyethylene, such as LDPE, or bio-based polymers, such as starch based polymers, or polylactic acid.

In embodiments, the outer sealing film has a thickness from about 0.1 mm to about 1 mm.

In embodiments, the insulating pad has an R value less than 0.52 $m^2 \cdot K/W$ per 2.54 cm.

In another aspect the present disclosure provides a thermally insulating liner according to any one of the herein disclosed embodiments for use in the storage or transportation of thermally sensitive articles.

In embodiments, the thermally sensitive article comprises one or more of pharmaceuticals, vaccines, biologics, laboratory samples, diagnostic materials, chemicals, food, and beverages.

In another aspect the present disclosure provides a method of manufacturing the thermally insulating liner according to any one of the herein disclosed embodiments comprising:
  subjecting one or more corrugated cardboard layers to a perforation process;
  stacking the one or more perforated corrugated cardboard layers so as to form an insulating pad; and
  sealing the insulating pad with an outer sealing film.

In embodiments, the perforation process is performed on a commercial cardboard perforating machine.

In another aspect the present disclosure provides a thermal storage container for storing or transporting thermally sensitive articles within a predefined temperature range comprising:
  an outer structure comprising one or more walls defining an inner container space, said inner container space comprising a thermally sensitive article location space;
  one or more thermally insulating liners according to any one of the herein disclosed embodiments, positioned within the inner container space, and configured to cover at least part of one or more inner surfaces of the walls of the outer structure.

In embodiments, the thermal storage container further comprises a source of cooling located between the thermally insulating liner and the thermally sensitive article location space.

In embodiments, the source of cooling comprises one or more of frozen gel, phase change material, and solid carbon dioxide.

In embodiments, the outer structure comprises a box or a pouch.

In embodiments, one or more walls of the outer structure comprise one or more of cardboard, corrugated cardboard, and polymer.

In embodiments, one or more walls of the outer structure comprise cardboard or corrugated cardboard.

In embodiments, the outer structure has a wall thickness from about 1 mm to about 10 mm, or from about 3 mm to about 7 mm.

In embodiments, the thermal storage container further comprises one or more slotted dividers located within the inner container space and configured to separate the cooling source from the thermally sensitive article location space.

In embodiments, the one or more slotted dividers enable fluid communication between the cooling source and the thermally sensitive article location space. This may assist in creating a defined temperature window suitable for the transport of a specific temperature sensitive article.

In embodiments, the one or more slotted dividers independently comprise one or more than one slots.

In embodiments, the one or more slotted dividers comprise corrugated cardboard.

In embodiments, the corrugated cardboard comprises multiple flutes.

The presence of slotted dividers enables advantageous control of the flow of cool air from the cooling source to the thermally sensitive article location space. In the absence of a slotted divider, a thermally sensitive sample may become too cold. In the presence of a divider absent slots, a thermally sensitive article may be exposed to too high temperatures, as cool air flow may be restricted.

As such the slotted divider allows a more precise temperature window to be achieved through separation of the thermally sensitive article from physical contact with the coolant while still maintaining cool air flow to the thermally sensitive article.

The shape of the slots is not critical, and may be circular, oval, cuboid, etc.

In another aspect the present disclosure further provides use of the thermal storage container according to any one of the herein disclosed embodiments for the storage or transportation of thermally sensitive articles.

In embodiments, the thermally sensitive article comprises one or more of pharmaceuticals, vaccines, biologics, laboratory samples, diagnostic materials, chemicals, food, and beverages.

In another aspect the present disclosure provides a thermal storage container for storing or transporting thermally sensitive articles within a predefined temperature range comprising:
  an outer structure comprising one or more walls defining an inner container space, said inner container space comprising a thermally sensitive article location space;
  one or more thermally insulating liners positioned within the outer structure, and configured to cover one or more inner surfaces of the walls of the outer structure;
  wherein the thermally insulating liner comprises one or more layers of perforated corrugated cardboard stacked to form an insulating pad and an outer sealing film covering the insulating pad.

The thermal storage container may additionally comprise a source of cooling located between the thermally insulating liner and the thermally sensitive article location space.

The source of cooling may comprise one or more of frozen gel, phase change material, and solid carbon dioxide.

In embodiments, the outer structure comprises a box or a pouch.

In embodiments, one or more walls of the outer structure comprise one or more of cardboard, corrugated cardboard, and polymer.

In embodiments, one or more walls of the outer structure comprise cardboard or corrugated cardboard.

In embodiments, the walls of the outer structure have a wall thickness from about 1 mm to about 10 mm, or from about 3 mm to about 7 mm.

In embodiments, the one or more layers of perforated corrugated cardboard are derived from one or more of single or multiple fluted corrugated cardboard.

In embodiments, the one or more layers of perforated corrugated cardboard are derived from one or more of single fluted, double fluted, and triple fluted corrugated cardboard.

In embodiments, the perforated corrugated cardboard is produced in a commercial cardboard perforating machine.

In embodiments, a layer of the perforated corrugated cardboard is more compressible in a direction perpendicular to a major surface of the perforated corrugated cardboard compared to a layer of non-perforated corrugated cardboard from which the perforated corrugated cardboard is derived.

In embodiments, a layer of perforated corrugated cardboard has an areal weight from about 100 g/m$^2$ to about 300 g/m$^2$.

In embodiments, a layer of perforated corrugated cardboard has a thickness from about 0.5 mm to about 10 mm.

In embodiments, the insulating pad has a thickness from about 10 mm to about 150 mm.

In embodiments, the insulating pad has a thickness from about 10 mm to about 70 mm.

In embodiments, the insulating pad comprises at least two layers of perforated corrugated cardboard.

In embodiments, the insulating pad comprises at least two layers of perforated corrugated cardboard which are derived from different corrugated cardboard flute designs, or at least three layers which are derived from different corrugated cardboard flute designs In embodiments, a layer of perforated corrugated cardboard comprises slits which penetrate the major surfaces of the layer.

In embodiments, a layer of perforated corrugated cardboard comprises regions across the outside major surfaces of the layer which are raised and lowered relative to each other.

In embodiments, the insulating pad is compressible in a direction perpendicular to a major surface of the pad.

In embodiments, the insulating pad is more compressible in a direction perpendicular to a major surface of the insulating pad compared to an insulating pad comprising non-perforated corrugated cardboard.

In embodiments, adjacent layers of perforated corrugated cardboard interlock with one another.

In embodiments, the thickness of the insulating pad is at least 10% less than the thickness of an equivalent insulating pad constructed from non-perforated corrugated cardboard, or at least 20% less, or at least 30% less, or at least 40% less, or at least 50% less.

In embodiments, the thickness of the insulating pad may be at least 50% less than the thickness of an equivalent insulating pad constructed from non-perforated corrugated cardboard.

In embodiments, the perforated corrugated cardboard layers have pockets of air located between the layers. This results in improved thermal insulation.

The pockets of air trapped between layers results in thermal insulation due to both the cardboard and air pockets.

Perforated corrugated cardboard is also flexible which is advantageous in terms of producing an insulating liner that conforms to the shape of a container within which it is placed.

Perforated corrugated cardboard also has cushioning properties which is advantageous in relation to shock absorption and support or protection of a thermally sensitive article.

In embodiments, the outer sealing film comprises a moisture proof or water proof sealing film.

In embodiments, the outer sealing film comprises an acrylic polymer or copolymer.

In embodiments, the outer sealing film comprises a styrene acrylic copolymer.

In embodiments, the outer sealing film comprises heat sealable paper. The heat sealable paper may be coated on one or both sides with a water-based coating.

In embodiments, the outer sealing film comprises LDPE, polyethylene, such as LDPE, or bio-based polymers, such as starch based polymers or polylactic acid.

In embodiments, the outer sealing film has a thickness from about 0.1 mm to about 1 mm.

In embodiments, the insulating pad has an R value of less than 0.52 m$^2$·K/W per 2.54 cm.

In another aspect the present disclosure provides the thermal storage container according to any one of the herein disclosed embodiments, for use in the storage or transportation of thermally sensitive articles.

In embodiments, the article comprises one or more of pharmaceuticals, vaccines, biologics, laboratory samples, diagnostic materials, chemicals, food, and beverages.

In another aspect the present disclosure provides a method of storing or transporting thermally sensitive articles within a predefined temperature range, the method comprising placing one or more temperature sensitive articles in the article location space of the thermal storage container according to any one of the herein disclosed aspects or embodiments.

In embodiments, the predefined temperature range is any range from a low of about −30° C. to a high of about 25° C. That is, any range having a low and high limit within the range −30° C. and 25° C.

In embodiments, the predefined temperature range is from about 2° C. to about 8° C.

In embodiments, the predefined temperature range is from about 15° C. to about 25° ° C.

In embodiments, the predefined temperature range is from about −30° ° C. to about 0° ° C.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, articles, compositions and processes are clearly within the scope of the disclosure, as described herein.

Further aspects of the present disclosure and further embodiments of the aspects described in the preceding paragraphs will become apparent from the following description, given by way of example and with reference to the accompanying drawings.

DETAILED DESCRIPTION OF THE EMBODIMENTS

Figure 1:
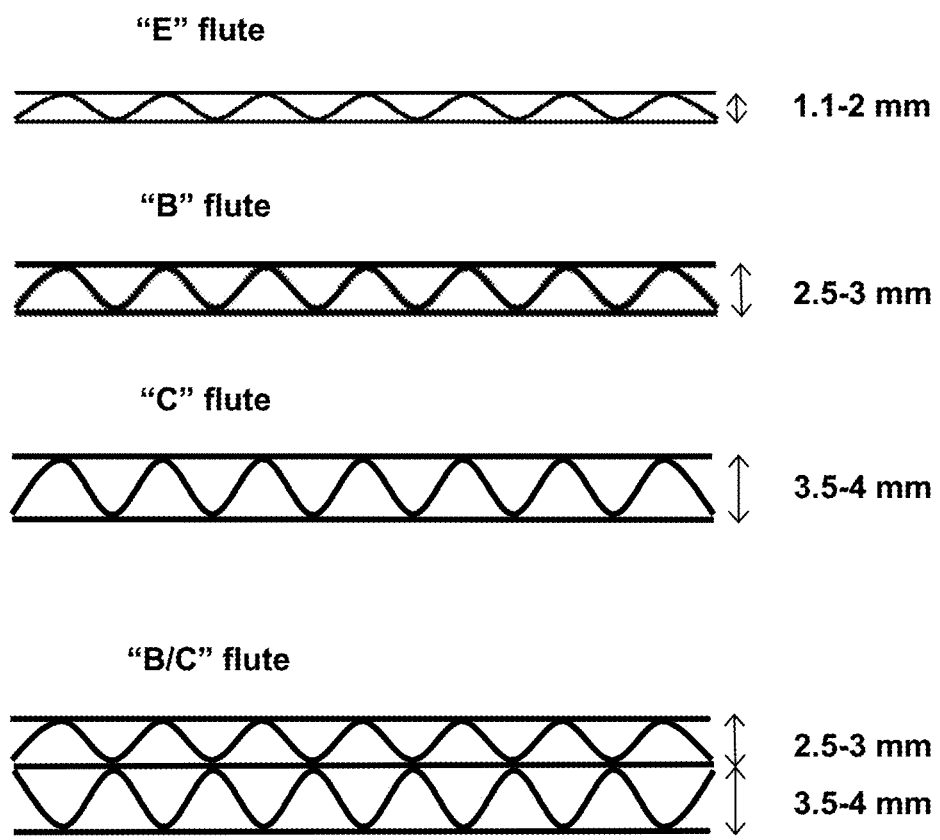
FIG. 1 shows the structure of several different corrugated cardboard flute types.

It will be understood that the disclosure described and defined in this specification extends to all alternative combinations of two or more of the individual features mentioned or evident from the text or drawings. All of these different combinations constitute various alternative aspects of the disclosure.

Definitions

For purposes of interpreting this specification, terms used in the singular will also include the plural and vice versa.

As used herein, except where the context requires otherwise, the term "comprise" and variations of the term, such as "comprising", "comprises" and "comprised", are not intended to exclude further additives, components, integers or steps.

"About" as used herein when referring to a measurable value such as an amount, a temporal duration, and the like, is meant to encompass variations of ±20% or ±10%, in some instances ±5%, in some instances ±1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As used herein the term "perforated corrugated cardboard" refers to corrugated cardboard that has been subjected to a perforation process utilising a commercial cardboard perforation machine.

Suitable commercial cardboard perforation machines include Infostop CB430 High Capacity Cardboard Perforating Shredder.

The present disclosure relates to a thermally insulating liner comprising one or more layers of perforated corrugated cardboard stacked to form an insulating pad and an outer sealing film covering the insulating pad.

The present disclosure also relates to a thermal storage container for storing or transporting thermally sensitive articles within a predefined temperature range comprising:
an outer structure comprising one or more walls defining an inner container space, said inner container space comprising a thermally sensitive article location space;
thermally insulating liner positioned within the inner container space, and configured to cover at least part of one or more inner surfaces of the walls of the outer structure;
wherein the thermally insulating liner comprises one or more layers of perforated corrugated cardboard stacked to form an insulating pad and an outer sealing film covering the insulating pad.

Outer Structure

The outer structure may be any suitable container, for example a box, a pouch and envelope and the like. The outer structure may be constructed from cardboard, corrugated cardboard, or polymers. The outer structure may be a cardboard box or a plastic box.

Perforated Corrugated Cardboard

In embodiments, the perforated corrugated cardboard layers are derived from corrugated cardboard. Corrugated cardboard is a rigid, substantially non-compressible, material comprising three layers of paper. An inner layer of paper, also called corrugated medium, which gives the cardboard its strength. During manufacturing, the inner layer is subjected to a corrugation process to create flutes or stiff folds in the paper. The corrugated medium is then glued in between two sheets of paper, which form the exterior layers.

The corrugated cardboard may comprise a single flute corrugated cardboard or multiple flute corrugated cardboard. Various flute designs, generally based on the height of the flute, may be utilised and these are commonly categorised in terms of flute height. FIG. 1 illustrates "E", "B" and "C" single flute designs and "B"/"C" dual flute design.

The corrugated cardboard utilised for preparing the perforated corrugated cardboard of the present disclosure may utilise "F" flute. "E" flute, "C" flute, "B" flute, or "A" flute. The corrugated cardboard may be any one of the aforementioned flute designs used singly, or any combination of these flute designs used multiply, for example a "B/"C" flute.

The single or multiple flute corrugated cardboard is perforated using commercial perforating equipment to impart a series of raised and lowered regions across the major outside surfaces of the corrugated cardboard and a series of perforations in the major surfaces of the corrugated cardboard. The perforations may be in the form of slits.

In embodiments the perforated corrugated cardboard comprises a repeating, perforating pattern across the major surfaces of the cardboard wherein the perforations fully penetrate the major surfaces of the cardboard.

In embodiments, the perforations comprise a column of relatively long slits of a substantially uniform width followed by a column of relatively shorter slits with a substantially uniform width. These columns may be substantially evenly spaced across the major surfaces. In embodiments, the width of the slits and the spacing between the slits may both independently vary.

In embodiments, alternating perforated corrugated cardboards with differing slit widths and/or different slit spacings may be utilised.

In embodiments, a layer of the perforated corrugated cardboard is more compressible in a direction perpendicular to a major surface of the perforated corrugated cardboard compared to a layer of non-perforated corrugated cardboard from which the perforated corrugated cardboard is derived.

Figure 2:
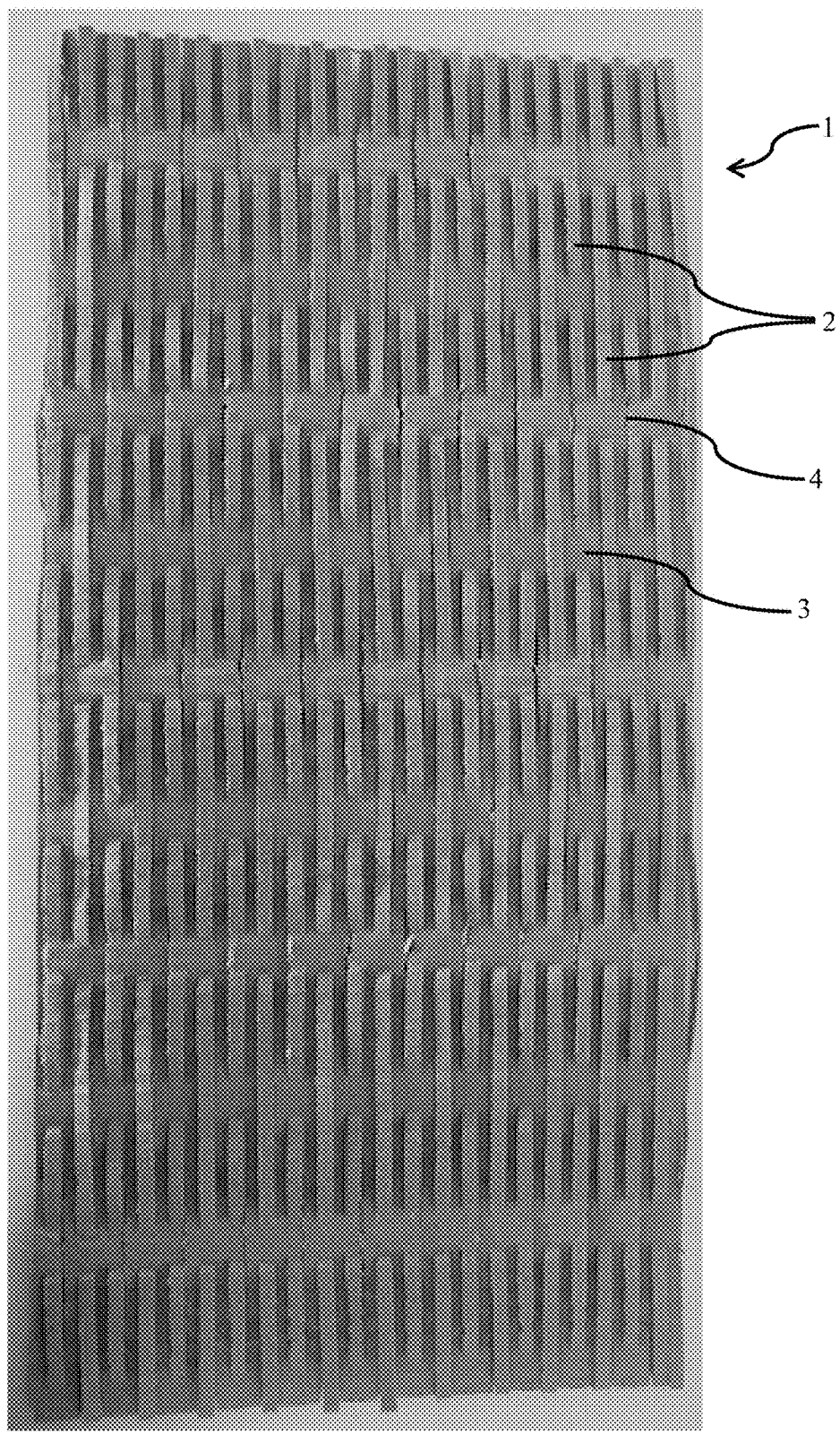
FIG. 2 is a photograph of a perforated corrugated cardboard layer according to one embodiment of the present disclosure.

FIG. 2 is a photograph of a perforated corrugated cardboard layer (1) according to one embodiment of the present disclosure. The photograph shows one outside major surface of the layer. The perforated corrugated cardboard layer comprises outside surface sections that are raised (2) and lowered (3) relative to each other and slits (4) which penetrate through the layer. The reverse outside major surface is similar, except that the sections which are raised and lowered are reversed.

Thermally Insulating Liner

In embodiments the thermally insulating liner comprises one or more layers of perforated corrugated cardboard stacked to form an insulating pad and an outer sealing film covering the insulating pad.

The insulating pad may comprise one, or two, or three, or more layers of perforated corrugated cardboard.

In an embodiment, each layer of perforated corrugated may be derived from the same corrugated cardboard. For example, each layer of perforated corrugated cardboard may be derived from "B" type flute design, or "C" type flute design.

In another embodiment, layers of different perforated corrugated cardboard may be utilised. For example, alternating layers derived from different flute designs. In one embodiment alternating layers of perforated corrugated cardboard derived from "B" and "B"/"C" flute designs may be utilised.

In another embodiment, the insulating pad may further comprise one or more layers of non-perforated cardboard. These layers may be located at any one or more positions relative to the perforated corrugated cardboard layers.

In another embodiment, the insulating pad may further comprise one or more layers of non-perforated corrugated cardboard. These layers may be located at any one or more positions relative to the perforated corrugated cardboard layers.

In one embodiment, one or more layers of a non-perforated thin "E" flute corrugated cardboard, or other suitable cardboard flute, may be located at any one or more positions relative to the perforated corrugated cardboard layers.

In embodiments, a layer of perforated corrugated cardboard of the insulating pad has an areal weight from about 100 g/m² to about 300 g/m².

In embodiments, a layer of perforated corrugated cardboard has a thickness from about 0.5 mm to about 10 mm.

In embodiments, the insulating pad has a thickness from about 10 mm to about 70 mm.

In embodiments, the insulating pad has a thickness from about 10 mm to about 60 mm, or from about 10 mm to about 50 mm, or from about 10 mm to about 40 mm.

In embodiments, the insulating pad comprises four layers of perforated corrugated cardboard comprising alternating perforated "B" flutes and perforated "B"/"C" flutes and has a total thickness from about 15 mm to about 25 mm. In other embodiments, the insulating pad comprises six layers of perforated corrugated cardboard comprising alternating perforated "B" flutes and perforated "B"/"C" flutes. Other perforated corrugated cardboard flute design combinations are contemplated.

In embodiments, the thickness of the insulating pad comprising one or more layers of perforated corrugated cardboard is significantly less than the thickness of a pad comprising the same layer(s) absent perforation, that is, compared layer(s) of corrugated cardboard. This is advantageous and unexpected. Perforation allows layers to interlock together thus reducing the overall thickness of the insulating pad which is desirable as it reduces the overall volume of the insulating pad and thus the volume of a container within which the insulating liner is utilised. Surprisingly, despite the reduction in insulating pad thickness, thermal effectiveness is excellent.

In embodiments, the insulating pad is more compressible in a direction perpendicular to a major surface of the insulating pad compared to an insulating pad comprising non-perforated corrugated cardboard.

Figure 3:
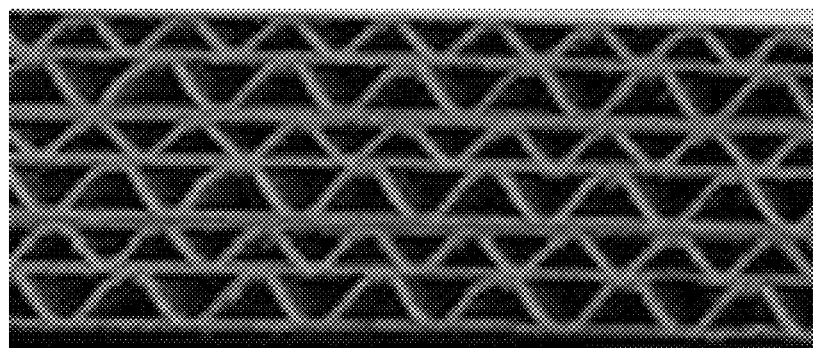
FIG. 3 shows photographs of a) three stacked "B"/"C" corrugated cardboard layers before perforation and, b) three stacked perforated "B"/"C" corrugated cardboard layers.
Figure 3:
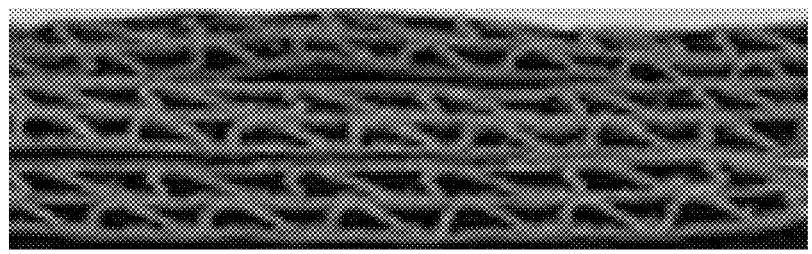

FIG. 3 compares insulating pads formed from a) three stacked "B"/"C" corrugated cardboard layers and b) three stacked perforated "B"/"C" corrugated cardboard layers. The thickness of the stacked corrugated cardboard layers in a) is about 20 mm, whereas that of the stacked perforated corrugated cardboard layers is about 17 mm. Furthermore, the stacked perforated corrugated cardboard layers are further compressible to a thickness of about 10 mm with the application of very light pressure in a vertical direction, that is in a direction perpendicular to a major surface of the stack. In contrast, the stacked non-perforated corrugated cardboard layers are effectively non-compressible under the application of a similar pressure in a vertical direction.

In embodiments, the thickness of the insulating pad may be at least 10% less than the thickness of an equivalent insulating pad constructed from non-perforated corrugated cardboard, or at least 20% less, or at least 30% less, or at least 40% less.

In embodiments, the thickness of the insulating pad may be at least 50% less than the thickness of an equivalent insulating pad constructed from non-perforated corrugated cardboard.

In embodiments, the insulating pad has an R value of less than 0.52 m²·K/W per 2.54 cm, or less than 0.50 m²·K/W per 2.54 cm, or less than 0.48 m²·K/W per 2.54 cm, or less than 0.46 m²·K/W per 2.54 cm, or less than 0.44 m²·K/W per 2.54 cm, or less than 0.42 m²·K/W per 2.54 cm, or less than 0.40 m²·K/W per 2.54 cm.

In embodiments, the insulating pad has an R value from about 0.2 m²·K/W per 2.54 cm to about 0.60 m²·K/W per 2.54 cm, or from about 0.2 m²·K/W per 2.54 cm to about 0.55 m²·K/W per 2.54 cm, or from about 0.2 m²·K/W per 2.54 cm to about 0.50 m²·K/W per 2.54 cm, or from about 0.2 m²·K/W per 2.54 cm to about 0.45 m²·K/W per 2.54 cm, or from about 0.2 m²·K/W per 2.54 cm to about 0.40 m²·K/W per 2.54 cm.

Outer Sealing Film

The thermally insulating pad may be sealed within an outer sealing film. In some embodiments the sealing film protects the thermally insulating pad from moisture which may condense on the insulating pad in view of the proximity of refrigerant during use. The sealing film may also be printable.

In some embodiments, the outer sealing film may be paper based which affords a thermally insulating liner that is fully recyclable. In embodiments, the paper based sealing film is moisture proof. The thermally insulating liner is suitable for kerbside collection and in such a case may be considered a single use liner.

In other embodiments, the outer sealing film is polymer based, for example, low density polyethylene (LDPE). Sealing films may also include bio-based polymers, such as starch based polymers or polylactic acid.

Such outer sealing films may provide thermally insulating liners suitable for multiple uses.

Thermal Storage Container

Figure 4:
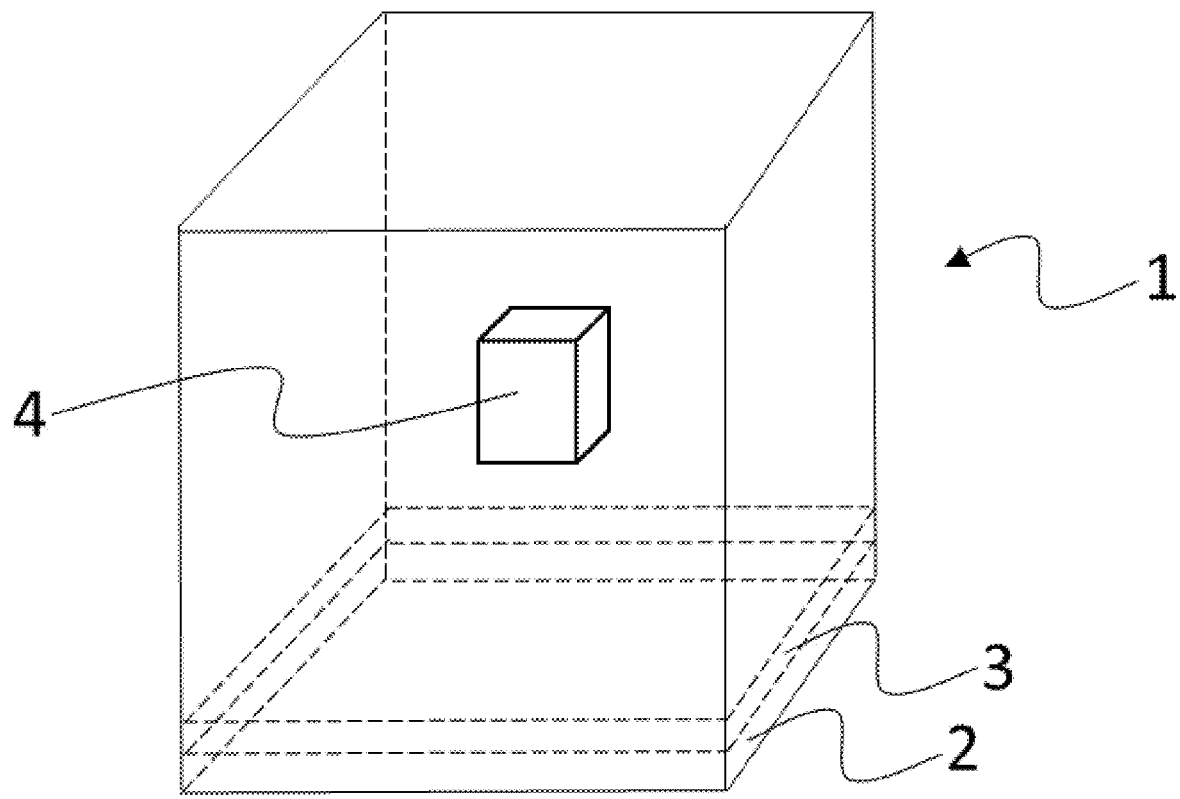
FIG. 4 is a drawing of a thermally sensitive article storage or transportation container according to one embodiment of the present disclosure.

FIG. 4 illustrates a thermal storage container (1) according to one embodiment of the present disclosure. The container is of a general cuboid shape, although other shapes are possible, including a pouch or an envelope. Thermally insulating liner (2) according to the present disclosure covers the bottom internal surface of the container. It will be appreciated that the thermally insulating liner may also cover or partially cover one or more of the further internal surfaces of the container. The thermally insulating liner may be present in the form of multiple insulting liners. For example, two, three or more insulating liners, depending on the internal surface profile of the container. A source of coolant (3) is located between the thermally insulating liner (3) and a thermally sensitive article location space (4) (not to scale). It will be appreciated that the source of coolant may entirely surround the thermally sensitive article location space, or may only partially surround the thermally sensitive article location space. The source of coolant may be single or multiple sources.

Figure 5:
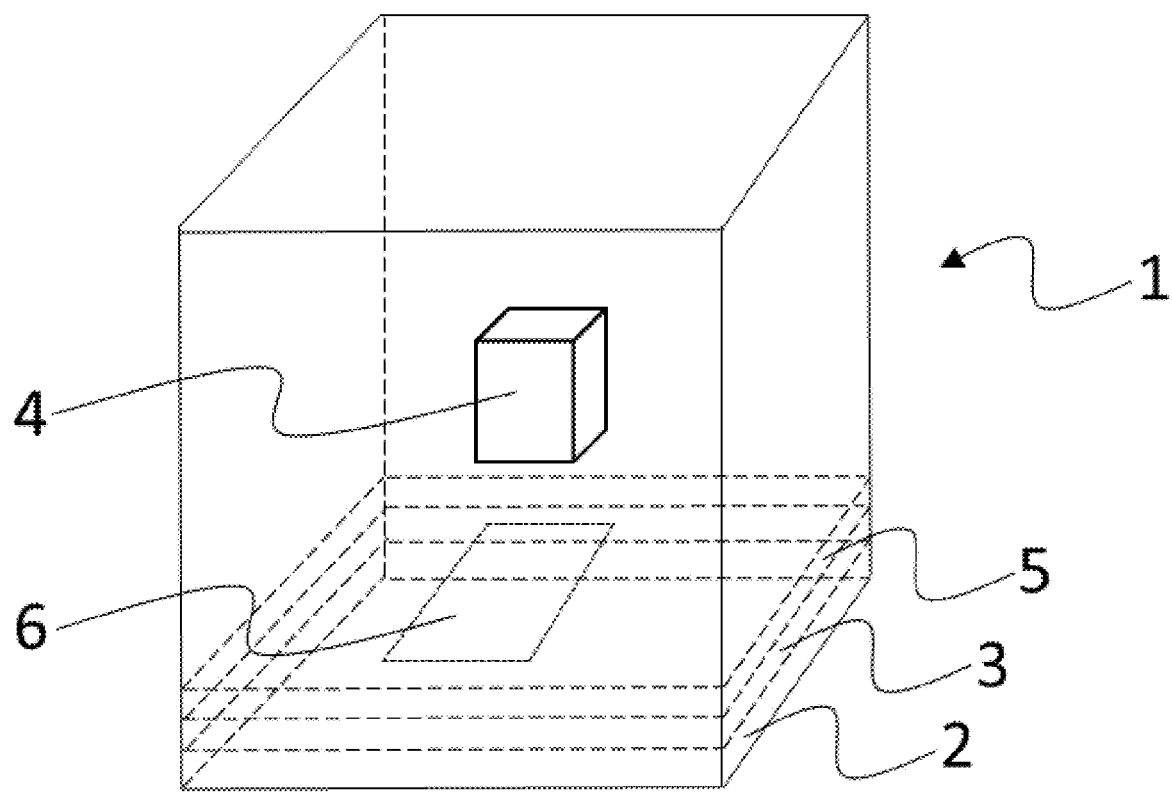
FIG. 5 is a drawing of a thermally sensitive article storage or transportation container according to another embodiment of the present disclosure.

FIG. 5 illustrates a thermal storage container (1) according to another embodiment of the present disclosure. The container is of a general cuboid shape, although other shapes are possible such as a pouch or an envelope. Thermally insulating liner (2) according to the present disclosure covers the bottom internal surface of the container. It will be appreciated that the thermally insulating liner may also cover one or more of the further internal surfaces of the container. The thermally insulating liner may be present in the form of multiple thermally insulating liners. For example, two, three or more thermally insulating liners, depending on the internal surface profile of the container. A source of coolant (3) is located between the thermally insulating liner (3) and a thermally sensitive article location space (4) (not to scale). It will be appreciated that the source of coolant may entirely surround the thermally sensitive article location space, or may only partially surround the thermally sensitive article location space. The source of coolant may be single or multiple sources of coolant. A divider (5) containing a slot (6) is located between the source of coolant (3) and the thermally sensitive article location space (4). It will be appreciated that more than one divider (5) may be present. In embodiments, multiple dividers may be present and located so as to surround the thermally sensitive article location space. The dividers may comprise a single slot or multiple slots.

It will be appreciated that through selection of the slot size and number of slots present in one or more dividers, the flow of cool air from the coolant source to the thermally sensitive article location space may be controlled. In this way, a predetermined temperature range for the article location space may be achieved.

EXAMPLES

Example 1

A corrugated cardboard layer having a "b" flute configuration was perforated using a commercial perforating unit (Infostop CB430 High Capacity Cardboard Perforating Shredder).

Separately, a corrugated cardboard layer having a "B"/"C" flute configuration was perforated.

A first insulating pad was assembled by stacking layers of alternating perforated "B" flute and perforated "B"/"C" flute for a total of four layers. The total pad thickness was 20 mm.

A second insulating pad was assembled by stacking layers of alternating perforated "B" flute and perforated "B"/"C" flute for a total of six layers. The total pad thickness was 23 mm.

Each of the assembled insulating pads was sealed in an outer paper liner.

In order to compare thermal performance, several thermal validations were performed, testing both a typical low-density EPS shipping box and the thermally insulating liners according to the present disclosure placed against the inner walls of a similar sized cardboard box outer container. Testing was performed in a purpose-fitted fan-forced incubator that simulated warm environmental conditions. The fan-forced incubator had an adjustable fan speed and fan baffle to ensure the test boxes were not exposed to direct air currents.

In all tests, the boxes were packed in an identical manner using the same amount of packed thermally sensitive article and frozen gel brick coolant. A layer of corrugated cardboard was placed between the thermally sensitive product and the gel brick. Calibrated temperature dataloggers were placed in the same position in each box to ensure comparable payload temperature data was collected. Within the fan-forced incubator each test was exposed to the same cycling temperature profile to ascertain product performance when exposed to the same external ambient conditions.

Testing compared both a small and large low-density polystyrene shipping box to a small and large box of the same internal volume lined with the presently disclosed thermally insulating liner. The dimensions of the small boxes were 30 cm (L)×20 cm (W)×25 cm (H) and of the large boxes 58 cm (L)×28 (W)×33.5 (H). Both test materials were packed in an identical manner and subjected to the same external temperature challenge over a 48-hour period. Test results are summarised in Tables 1 and 2.

TABLE 1

(small box)

| Insulation type and thickness | Amount of frozen coolant used | Average external temperatures tested against | Time payload remained between 2-8° C. |
|---|---|---|---|
| Low-density polystyrene, 30 mm thickness | 2 × 1 kg frozen gel bricks | 26.3° C. | 26 hrs 34 mins |
| 4 layer perforated corrugated cardboard in outer paper liner, 20 mm thickness | 2 × 1 kg frozen gel bricks | 26.4° C. | 26 hrs 39 mins |

TABLE 2

(large box)

| Insulation type and thickness | Amount of frozen coolant used | Average external temperatures tested against | Time payload remained between 2-8° C. |
|---|---|---|---|
| Low-density polystyrene, 30 mm thickness | 4 × 1 kg frozen gel bricks | 27.6° C. | 29 hrs 34 mins |

TABLE 2-continued (large box)

| Insulation type and thickness | Amount of frozen coolant used | Average external temperatures tested against | Time payload remained between 2-8° C. |
|---|---|---|---|
| 6 layer perforated corrugated cardboard in outer paper liner, 23 mm thickness | 4 × 1 kg frozen gel bricks | 26.5° C. | 42 hrs 16 mins |

The test results demonstrate that the presently disclosed thermally insulating liners can provide comparable or better thermal performance to a similar-sized low density polystyrene shipping box. It is notable that the thermally insulating liners are thinner than the EPS insulation, yet achieve comparable or superior performance.

Example 2

In this example, an outer box of dimensions 29.5 cm (L)×23.5 cm (W)×31.5 cm (H) was utilised. The interior of the box was lined with thermally insulating liner according to the present disclosure (six layer perforated corrugated cardboard as in Example 1). Four 1 kg frozen gel bricks were placed in the box adjacent to the liner along with three twin flute corrugated cardboard dividers each of dimensions 15 cm×12 cm. The dividers were disposed two on top and one below the thermally sensitive article, thus separating the thermally sensitive article from the gel bricks. In another experiment the corrugated cardboard divider comprised slots of approximate dimensions 10 cm×4 cm.

The average external temperature was between 26.5° C. and 28.2° C. and the thermally sensitive article location maintained a temperature between 2 and 8° C. for 52.5 hours for the non-slotted dividers and 67 hours for the slotted dividers. This demonstrates that a slotted divider located between the thermally sensitive article location and the frozen gel bricks maintains the desired temperature window for a longer period of time.

Example 3

In this example, a mailing pouch was lined with thermally insulating liner according to the present disclosure (three layer perforated corrugated cardboard) and a 1.2 kg-18° C. phase change material was placed in the pouch. The average ambient temperature was 23.5° C. and the temperature inside the pouch was maintained below 0° C. for 36 hours.

Example 4

In this example, a comparison was made between the insulating liner of the present disclosure and an insulating liner made from non-perforated corrugated cardboard. An outer box of dimensions 29.5 cm (L)×23.5 cm (W)×31.5 cm (H) was utilised. The interior of the box was lined with thermally insulating liner according to the present disclosure (five layer perforated corrugated cardboard of B/C flute design in an outer liner). Another box of the same dimensions, was similarly lined, the only difference being that the corrugated cardboard was not perforated. Four 1 kg frozen gel bricks were placed in each box adjacent to the liner.

The boxes were tested under ISTA 7D 24-hour summer profile (cycling). The temperature inside the box (thermally sensitive product space) was maintained in the range 2-8° C. for 51 hours 40 mins using the insulating liner of the present disclosure. In contrast, with the insulating liner made with non-perforated corrugated cardboard under the same test conditions, the temperature inside the box (thermally sensitive product space) was maintained in the range 2-8° C. for only 37 hours. This demonstrates a clear advantage of the insulating liner of the present disclosure.

The invention claimed is:

1. A thermally insulating liner comprising one or more layers of perforated corrugated cardboard stacked to form an insulating pad and an outer sealing film covering the insulating pad,
   wherein a layer of the perforated corrugated cardboard is more compressible in a direction perpendicular to a major surface of the perforated corrugated cardboard compared to a layer of non-perforated corrugated cardboard from which the perforated corrugated cardboard is derived; and
   wherein a layer of perforated corrugated cardboard comprises slits which penetrate the major surfaces of the layer.

2. The thermally insulating liner according to claim 1, wherein the one or more layers of perforated corrugated cardboard are derived from one or more of single or multiple fluted corrugated cardboard.

3. The thermally insulating liner according to claim 1, wherein the one or more layers of perforated corrugated cardboard are derived from one or more of single fluted, double fluted, and triple fluted corrugated cardboard.

4. The thermally insulating liner according to claim 1, wherein perforated corrugated cardboard is produced on a commercial cardboard perforating machine.

5. The thermally insulating liner according to claim 1, wherein a layer of perforated corrugated cardboard has an areal weight from about 100 g/m$^2$ to about 300 g/m$^2$.

6. The thermally insulating liner according to claim 1, wherein a layer of perforated corrugated cardboard has a thickness from about 0.5 mm to about 10 mm.

7. The thermally insulating liner according to claim 1, wherein the insulating pad has a thickness from about 10 mm to about 150 mm.

8. The thermally insulating liner according to claim 1, wherein the insulating pad comprises at least two layers of perforated corrugated cardboard.

9. The thermally insulating liner according to claim 1, wherein the insulating pad comprises at least two layers of perforated corrugated cardboard derived from corrugated cardboard having different flute designs.

10. The thermally insulating liner according to claim 1, wherein a layer of perforated corrugated cardboard comprises regions across the major outside surfaces of the layer which are raised and lowered relative to each other.

11. The thermally insulating liner according to claim 1, wherein a layer of perforated corrugated cardboard has a web like structure.

12. The thermally insulating liner according to claim 1, wherein the insulating pad is compressible in a direction perpendicular to a major surface of the pad.

13. The thermally insulating liner according to claim 1, wherein the insulating pad is more compressible in a direction perpendicular to a major surface of the insulating pad compared to an insulating pad comprising non-perforated corrugated cardboard.

14. The thermally insulating liner according to claim 1, wherein adjacent layers of perforated corrugated cardboard interlock with one another.

15. The thermally insulating liner according to claim 1, wherein pockets of air are located between the perforated corrugated cardboard layers.

16. The thermally insulating liner according to claim 1, wherein the thickness of the insulating pad is at least 10% less than the thickness of an equivalent insulating pad constructed from non-perforated corrugated cardboard.

17. The thermally insulating liner according to claim 1, wherein the outer sealing film comprises a moisture proof or water proof sealing film.

18. The thermally insulating liner according to claim 1, wherein the insulating pad has an R value less than 0.52 $m^2 \cdot K/W$ per 2.54 cm.

19. A thermal storage container for storing or transporting thermally sensitive articles within a predefined temperature range comprising:
   an outer structure comprising one or more walls defining an inner container space, said inner container space comprising a thermally sensitive article location space;
   one or more thermally insulating liners according to claim 1, positioned within the inner container space, and configured to cover at least part of one or more inner surfaces of the walls of the outer structure.

20. The thermal storage container according to claim 19, further comprising a source of cooling located between the thermally insulating liner and the thermally sensitive article location space.

21. The thermal storage container according to claim 19, wherein the outer structure comprises a box, a pouch or an envelope.

22. The thermal storage container according to claim 19, wherein the outer structure has a wall thickness from about 1 mm to about 10 mm.

23. The thermal storage container according to claim 19 further comprising one or more slotted dividers located within the inner container space and configured to separate the cooling source from the thermally sensitive article location space.

24. The thermal storage container according to claim 23, wherein the one or more slotted dividers enable fluid communication between the cooling source and the thermally sensitive article location space.

25. The thermal storage container according to claim 23, wherein the one or more slotted dividers independently comprise one or more than one slots.

26. The thermal storage container according to claim 23, wherein the one or more slotted dividers comprise corrugated cardboard.

27. The thermal storage container according to claim 19, wherein the thermally sensitive article comprises one or more of pharmaceuticals, vaccines, biologics, laboratory samples, diagnostic materials, chemicals, food, and beverages.

28. A method of storing or transporting thermally sensitive articles within a predefined temperature range, the method comprising placing one or more temperature sensitive articles in the article location space of the thermal storage container according to claim 19.

29. The method according to claim 28, wherein the predefined temperature range is from about 2° C. to about 8° C.

30. The method according to claim 28, wherein the predefined temperature range is from about −30° C. to about 25° C.

* * * * *